US012584350B2

(12) United States Patent
Chen

(10) Patent No.: US 12,584,350 B2
(45) Date of Patent: Mar. 24, 2026

(54) LIGHT-ADJUSTABLE SHADE

(71) Applicant: Jin Daung Co., Ltd., Changhua County (TW)

(72) Inventor: Hsiao-Cheng Chen, Changhua County (TW)

( * ) Notice: Subject to any disclaimer, the term of this patent is extended or adjusted under 35 U.S.C. 154(b) by 176 days.

(21) Appl. No.: 18/523,812

(22) Filed: Nov. 29, 2023

(65) Prior Publication Data

US 2025/0172039 A1 May 29, 2025

(51) Int. Cl.
*E06B 9/36* (2006.01)
*E06B 9/24* (2006.01)

(52) U.S. Cl.
CPC ...... *E06B 9/367* (2013.01); *E06B 2009/2405* (2013.01); *E06B 2009/2458* (2013.01)

(58) Field of Classification Search
CPC ..... E06B 2009/2405; E06B 2009/2447; E06B 2009/2452; E06B 2009/2458; E06B 9/367; E06B 9/36; E06B 9/362
See application file for complete search history.

(56) References Cited

U.S. PATENT DOCUMENTS

| | | | | |
|---|---|---|---|---|
| 3,911,991 A * | 10/1975 | Malferrari | A47H 13/00 160/202 |
| 5,109,910 A * | 5/1992 | Tortorella | E06B 9/32 160/202 |
| 6,892,783 B1 * | 5/2005 | Comeau | A47H 23/01 160/98 |
| 7,174,944 B1 * | 2/2007 | Clark | E05D 15/08 49/424 |
| 8,025,088 B2 * | 9/2011 | Kim | E06B 9/40 160/125 |
| 8,646,509 B2 * | 2/2014 | Chu | E06B 9/24 160/237 |
| 8,959,835 B2 * | 2/2015 | Drohan | E06B 3/6722 49/63 |
| 9,631,422 B1 * | 4/2017 | Chen | E06B 9/42 |
| 10,060,184 B2 * | 8/2018 | Chu | E06B 9/42 |

(Continued)

FOREIGN PATENT DOCUMENTS

| | | | |
|---|---|---|---|
| DE | 202007008111 U1 * | 8/2007 | A47H 1/04 |
| DE | 202008011140 U1 * | 10/2008 | E06B 9/40 |

(Continued)

*Primary Examiner* — Johnnie A. Shablack
(74) *Attorney, Agent, or Firm* — Che-Yang Chen; Law Office of Michael Chen

(57) ABSTRACT

A light-adjustable shade structure includes a top beam, a plurality of dimmable curtains, and a plurality of positioning devices. The top beam is provided with a plurality of tracks, the tracks are respectively equipped with a sliding seat connected and driven by each other. The dimmable curtains are staggered from top to bottom with a plurality of light shielding parts and a plurality of light transmitting parts, the dimmable curtains are wound and connected respectively between an upper shaft rod and a lower shaft rod to form a double-layer structure. The positioning devices are installed on the dimmable curtain to adjust the dimmable curtain to form In the transparent or light-shielding state. The dimmable curtain is pushed, pulled, or closed along the trail of the top beam, and the effect of adjusting light can be achieved by staggering or facing the light shielding part and the light transmitting part.

9 Claims, 13 Drawing Sheets

(56) References Cited

U.S. PATENT DOCUMENTS

| | | | | | |
|---|---|---|---|---|---|
| 10,731,410 | B2 * | 8/2020 | Teuscher | E06B 9/367 | |
| 10,895,106 | B2 * | 1/2021 | Goldberg | E06B 9/44 | |
| 11,060,346 | B2 * | 7/2021 | Chuang | A47H 5/032 | |
| 2008/0156951 | A1 * | 7/2008 | Lin | A47H 1/104 | 248/261 |
| 2009/0229768 | A1 * | 9/2009 | Cheng | A47H 23/06 | 160/237 |
| 2011/0030169 | A1 * | 2/2011 | Aebi | E06B 9/362 | 16/87.4 R |
| 2012/0043029 | A1 * | 2/2012 | Gaskill | E06B 9/42 | 160/121.1 |
| 2016/0348428 | A1 * | 12/2016 | Cheng | E06B 9/40 | |
| 2022/0259920 | A1 * | 8/2022 | Kwak | E06B 9/44 | |
| 2025/0092738 | A1 * | 3/2025 | Byun | E06B 9/262 | |
| 2025/0172039 | A1 * | 5/2025 | Chen | E06B 9/367 | |

FOREIGN PATENT DOCUMENTS

| | | | | |
|---|---|---|---|---|
| DE | 202017006772 | U1 * | 5/2018 | F16B 5/0692 |
| DE | 102018003954 | A1 * | 11/2019 | E06B 9/40 |
| EP | 3670819 | A1 * | 6/2020 | E06B 9/36 |
| FR | 2921404 | A1 * | 3/2009 | A47H 1/08 |
| KR | 20100130836 | A * | 12/2010 | A47G 5/02 |

* cited by examiner

A-A

LIGHT-ADJUSTABLE SHADE

BACKGROUND OF THE INVENTION

Field of the Invention

The present invention relates to a shade structure, in particular to a light-adjustable shade structure.

Description of the Related Art

The conventional curtain or shade is generally a curtain composed of a plurality of curtain clothes. A plurality of sliding frames supports the curtain, the curtains are hung and fixed on the sliding frames, and the sliding frames are movably assembled at the bottom of a horizontal track. By pushing and pulling the sliding frame, the sliding frame moves one by one along the horizontal track to laterally change the position of the curtain, so that the curtain can be expanded and collapsed to achieve the purpose of adjusting light.

However, the conventional curtain structure achieves the light adjustment effect by unfolding and closing the curtain through lateral push-pull displacement. When the curtain is fully unfolded, a complete light blocking state is formed, and the partial light adjustment effect cannot be maintained while pursuing privacy. When the curtain is folded, it starts to push back from one side. As a result, the light adjustment can only be gradually achieved and adjusted as the curtain is pulled back. As a result, in order for light to penetrate into the middle or end section of the curtain, at least half of the curtain needs to be folded. But it also loses the privacy function and does not have the choice of light-shielding or light-transmitting positions, thus limiting the position where light can pass into the room, which lacks practicality.

SUMMARY OF THE INVENTION

The technical problem to be solved by the present invention is to provide a dimmable curtain structure or a light adjustable shade in view of the above-mentioned deficiencies in the prior art.

The light-adjustable shade structure of the present invention includes a top beam, the bottom of the top beam is provided with a plurality of tracks, the tracks are respectively equipped with a sliding seat, and the adjacent sliding seats are connected and driven by each other. A plurality of dimmable curtains, the dimmable curtains are staggered from top to bottom with a plurality of light shielding parts and a plurality of light transmitting parts, the dimmable curtains are wound and connected respectively between an upper shaft rod and a lower shaft rod, the upper and lower shaft rods are used to pull and support the dimmable curtain to form a double-layer structure, and the two ends of the upper shaft rod are respectively connected to two combination blocks. A plurality of positioning devices are installed on the dimmable curtain, the positioning devices each include a positioning part, a slider and a moving block that move along the positioning part, the positioning part is longitudinally disposed inside the double layers of the dimmable curtain, and the positioning part is attached and fixed to one side of the dimmable curtain, the slider is disposed inside the double layers of the dimmable curtain, the slider is attached and fixed to the other side of the dimmable curtain, and the moving block is attached and fixed to the outer surface of the dimmable curtain. When the moving block is operated to adjust the dimmable curtain to form In the transparent or light-shielding state, the slider moves up and down along the positioning part at the same time, and further adjusts and positions the dimmable curtain through the contact between the slider and the positioning part. A plurality of linking parts have corresponding two hooking parts that are adjacent to each other used to hook the lower tracks at the bottom end of two adjacent curtains. When the curtains are pushed and pulled, the hooking parts abut against the cover of the lower tracks to achieve connection and moving functions.

Preferably, two through holes are formed at both ends of the sliding seat, two openings are formed at both ends of the upper shaft rod, and a first convex part and a second convex part are provided on the same side of the combination block. The first and second convex parts are respectively combined with the through hole and the opening so that the sliding seat and the upper shaft rod are assembled and connected through the two combination blocks.

Preferably, the lower shaft rod is sunk at the bottom end of the dimmable curtain, the lower track is inserted outside the lower shaft rod and the dimmable curtain, the two ends of the lower track are assembled with two covers, and the covers are combined and fixed with both ends of the lower shaft rod.

Preferably, the positioning part of the positioning device is hollow and has a longitudinal channel, the slider is penetrated in the longitudinal channel of the positioning part, the surface of the slider has a guide groove, the guide groove is engaged with the positioning part to guide the slider, and the slider is attached and fixed to the dimmable curtain with the surface not having the guide groove.

Preferably, the moving block of the positioning device is aligned with the slider and fixed on the outer surface of the dimmable curtain so that the moving block can directly drive the slider to linearly move along the longitudinal channel of the positioning part.

Preferably, the length of the positioning part of the positioning device is equal to the length of the light shielding part, the positioning part is attached and fixed to the inner surface of one of the light shielding parts, and the slider and the moving block are aligned and attached to the upper edge of one of the light shielding parts.

Preferably, the upper shaft rod is a flat tube.

Preferably, the upper shaft rod is a round tube.

Preferably, the hooking part of the linking part is formed corresponding to an outer contour shape of the lower track, the upper end of the hooking part forms a shrinkage, the size of the shrinkage is smaller than the size of the widest part of the lower track, and the hooking part is flexibly hooked the lower track.

The dimmable, or light-adjustable, curtain of the present invention is double-layered and is staggered with the light shielding part and the light transmitting part, so that the dimmable curtain can be pushed and opened along the track of the top beam. In addition, the effect of adjusting the light can also be achieved by staggering or facing the light shielding part and the light transmitting part, so that the dimmable curtain can be adjusted individually for the position where light is transmitted or shielded. When pursuing privacy in the house, it can also maintain local light transmission effect. Each dimmable curtain is equipped with a positioning device. The moving block 33 located on the outer surface of the dimmable curtain can be used to drive the slider to move up and down along the positioning part to achieve the function of adjusting light by the dimmable curtain. Further, through the contact between the slider and the top or bottom end of the positioning part, the purpose of adjusting and positioning the dimmable curtain can be achieved.

The light-adjustable shade of the present invention is matched with a plurality of linking parts to achieve the effect of pulling and linking the dimmable curtain. The linking parts are sequentially buckled with two hook parts between two adjacent lower tracks. The covers at both ends of the lower track are formed against the hook parts when the dimmable curtain is pushed, pulled, or closed, thereby effectively simplifying the linkage between the dimmable curtains. At the same time, the linking part is used to connect two adjacent dimmable curtains to increase the stable connection effect between the dimmable curtains. When the dimmable curtains are pulled and unfolded, the two adjacent dimmable curtains can be prevented from making noise from the lower tracks colliding with each other, and can effectively prevent the edges of two adjacent dimmable curtains from being squeezed and deformed. The overlapping areas can be maintained between the dimmable curtains to prevent light transmission and achieve the purpose of shading.

BRIEF DESCRIPTION OF THE DRAWINGS

The following drawings are merely examples for illustrative purposes according to various disclosed embodiments and are not intended to limit the scope of the present disclosure.

DETAILED DESCRIPTION OF THE INVENTION

Figure 1:
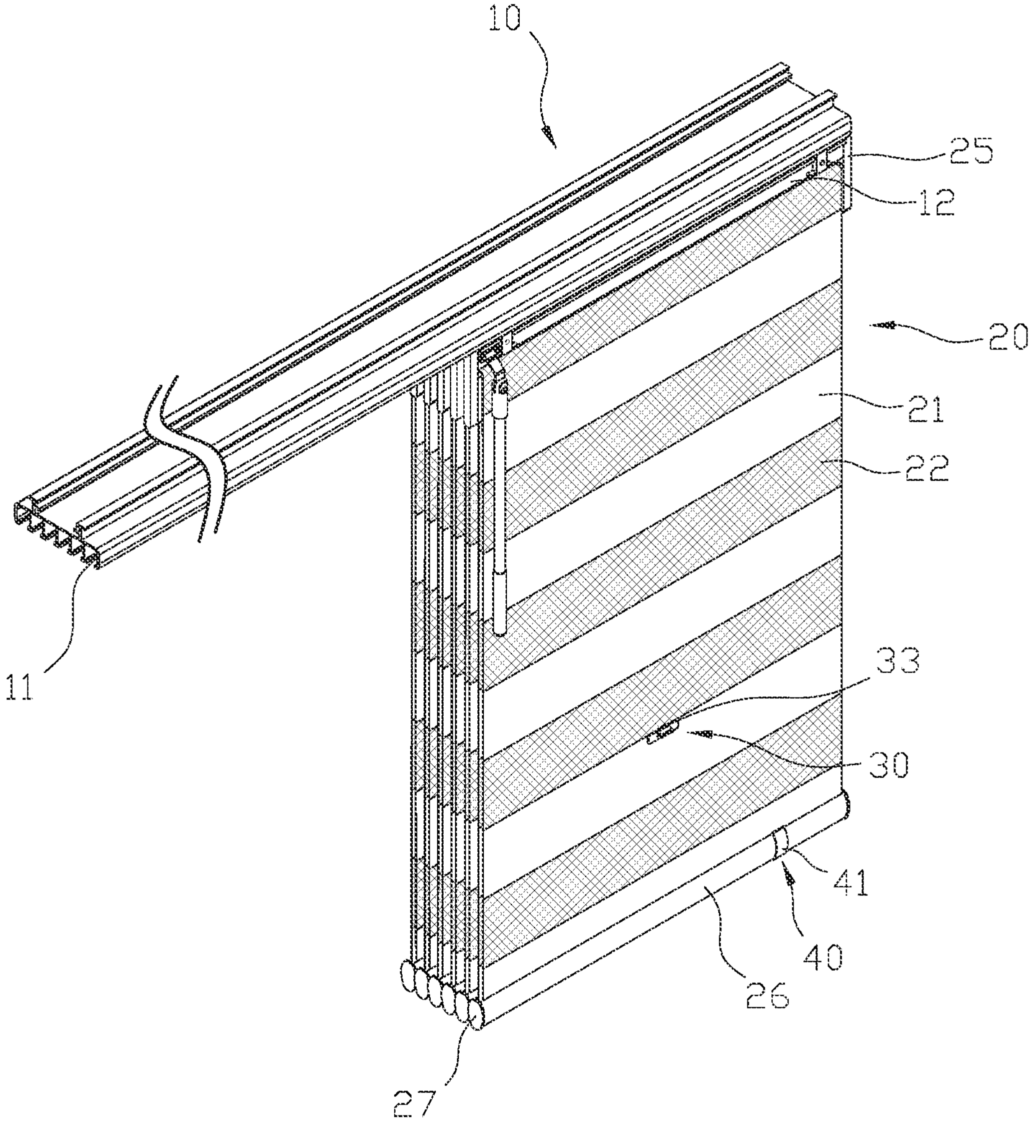
FIG. 1 is a perspective view of the present invention.
Figure 2:
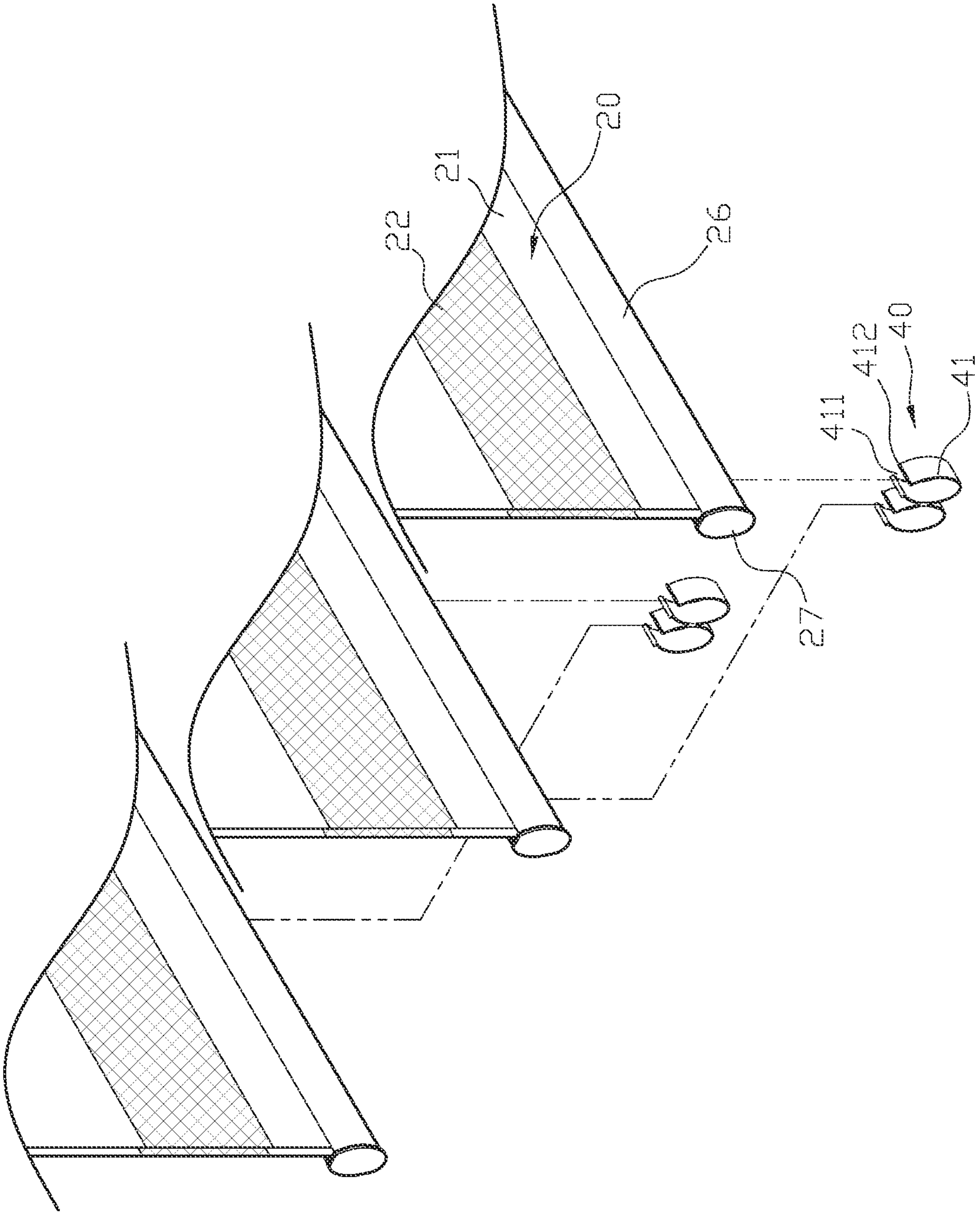
FIG. 2 is an exploded view of the dimmable curtain, slide seat, and positioning device of the present invention.
Figure 3:
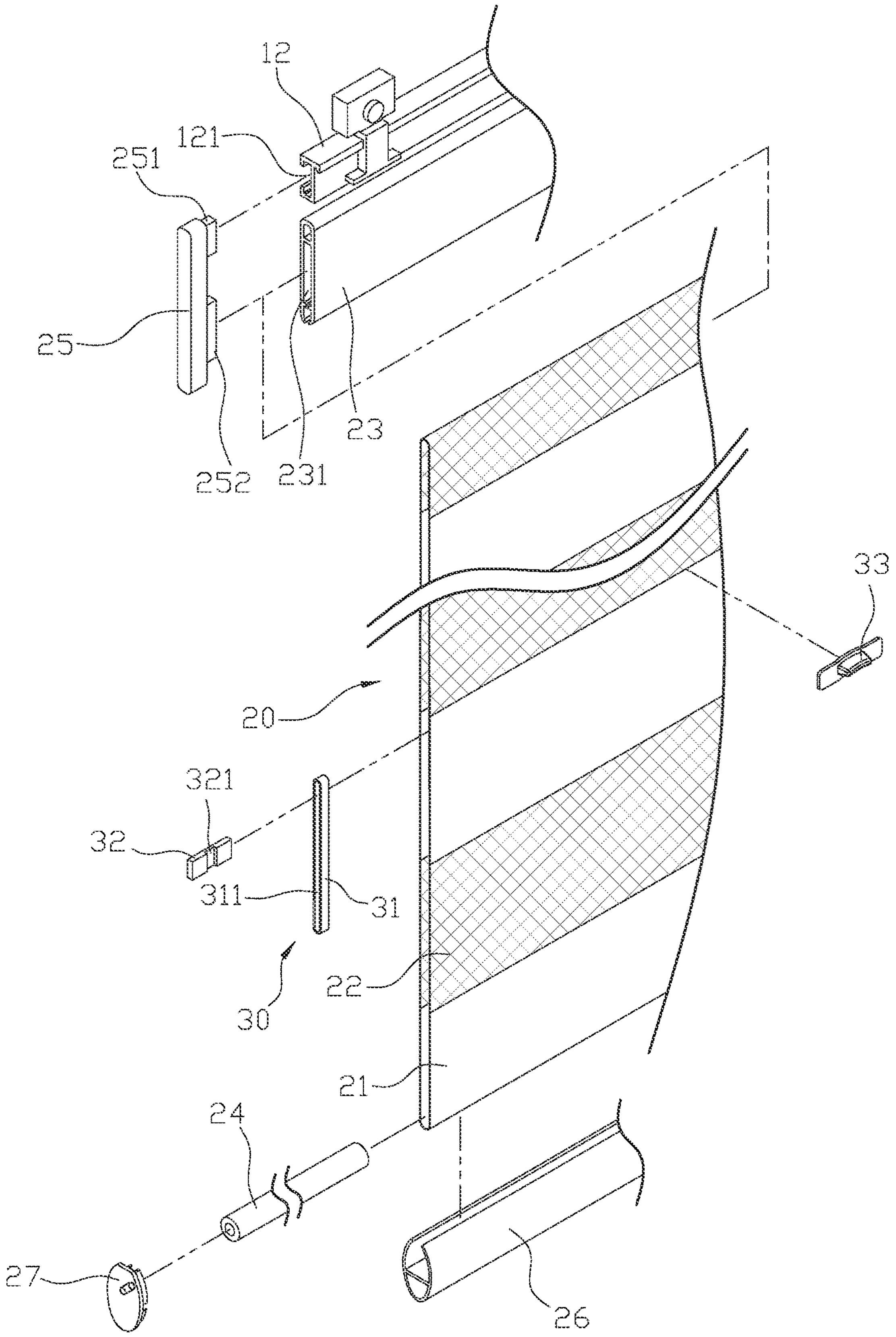
FIG. 3 is a schematic diagram of the combination of the dimmable curtain and the linking part of the present invention.
Figure 4:
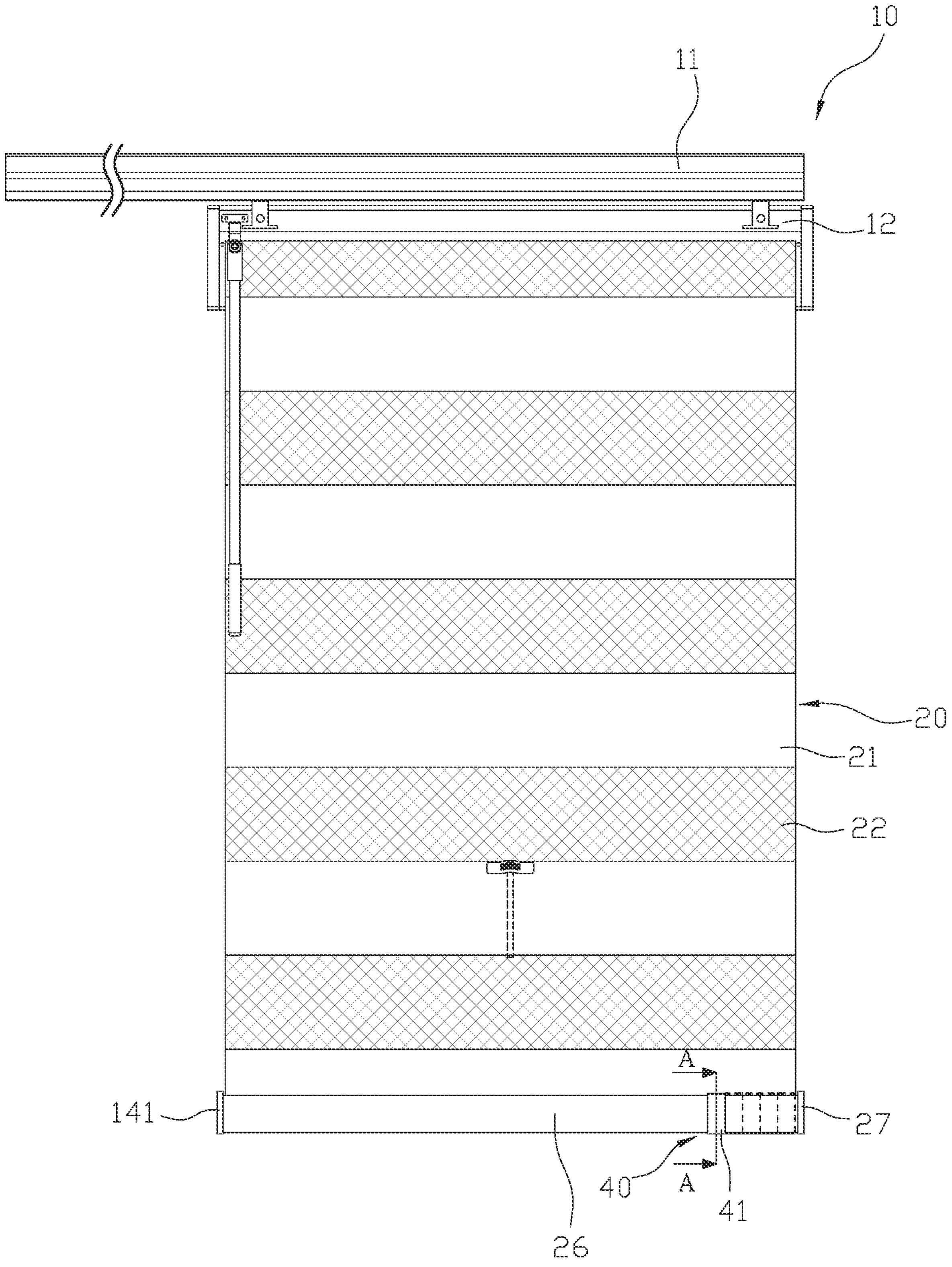
FIG. 4 is a front view of the assembly of the present invention.
Figure 5:
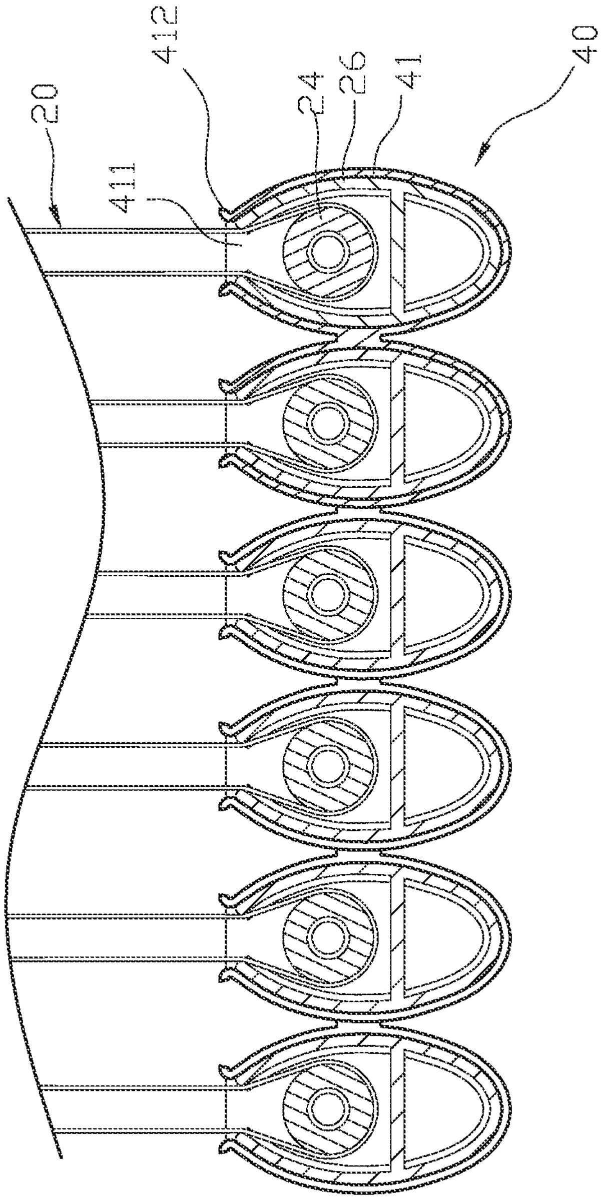
FIG. 5 is a partially enlarged cross-sectional view of the assembly of the lower track and the linking part of the present invention.

As shown in FIGS. 1 to 6, a light-adjustable shade includes a top beam 10, a plurality of dimmable curtains 20, a plurality of positioning devices 30, and a plurality of linking parts 40. The bottom of the top beam 10 is provided with a plurality of tracks 11, the tracks 11 are respectively equipped with a sliding seat 12, and the adjacent sliding seats 12 are connected and driven by each other. The dimmable curtains 20 are staggered from top to bottom with a plurality of light shielding parts 21 and a plurality of light transmitting parts 22, the dimmable curtains 20 are wound and connected respectively between an upper shaft rod and 23 a lower shaft rod 24, the upper and lower shaft rods 23 and 24 are used to pull and support the dimmable curtain 20 to form a double-layer structure, and the two ends of the upper shaft rod 23 are respectively connected to two ends of the sliding seats 12 via two combination blocks 25.

Two through holes 121 are formed at both ends of the sliding seat 12, two openings 231 are formed at both ends of the upper shaft rod 23, and a first convex part 251 and a second convex part 252 are provided on the same side of the combination block 25. The first and second convex parts 251 and 252 are respectively combined with the through hole 121 and the opening 231 so that the sliding seat 12 and the upper shaft rod 23 are assembled and connected through the two combination blocks 25. The lower shaft rod 24 is sunk at the bottom end of the dimmable curtain 20, a lower track 26 is inserted outside the lower shaft rod 24 and the dimmable curtain 20, the two ends of the lower track 26 are assembled with two covers 27, and the covers 27 are combined and fixed with both ends of the lower shaft rod 24.

The plurality of positioning devices 30 are installed on the dimmable curtain 20, the positioning devices 30 each include a positioning part 31, a slider 32, and a moving block 33 that move along the positioning part 31, the positioning part 31 is longitudinally disposed inside the double layers of the dimmable curtain 20, and the positioning part 31 is attached and fixed to one side of the dimmable curtain 20, the positioning part 31 of the positioning device 30 is hollow and has a longitudinal channel 311, the slider 32 is disposed inside the double layers of the dimmable curtain 20, the slider 32 is penetrated in the longitudinal channel 311 of the positioning part 31, the surface of the slider 32 has a guide groove 321, the guide groove 321 is engaged with the positioning part 31 to guide the slider 32, and the slider 32 is attached and fixed to the dimmable curtain 20 with the surface not having the guide groove 321. The moving block 33 of the positioning device 30 is aligned with the slider 32 and fixed on the outer surface of the dimmable curtain 20 so that the moving block 33 can directly drive the slider 32 to linearly move along the longitudinal channel 311 of the positioning part 31.

The plurality of linking parts 40 have corresponding two hooking parts 41 that are adjacent to each other and used to hook the lower tracks 26 at the bottom end of two adjacent curtains 20. The hooking part 41 is formed corresponding to an outer contour shape of the lower track 26, the upper end of the hooking part 41 forms a shrinkage 411, the end edge of the shrinkage 411 is further folded outward to have two leading ends 412, the size of the shrinkage 411 is smaller than the size of the widest part of the lower track 26, and the hooking part 41 is flexibly hooked the lower track 26.

In addition, the length of the positioning part 31 of the positioning device 30 is equal to the length of the light shielding part 21, the positioning part 31 is attached and fixed to the inner surface of one of the light shielding parts 21, and the slider 31 and the moving block 33 are aligned and attached to the upper edge of one of the light shielding parts 21.

Figure 6:
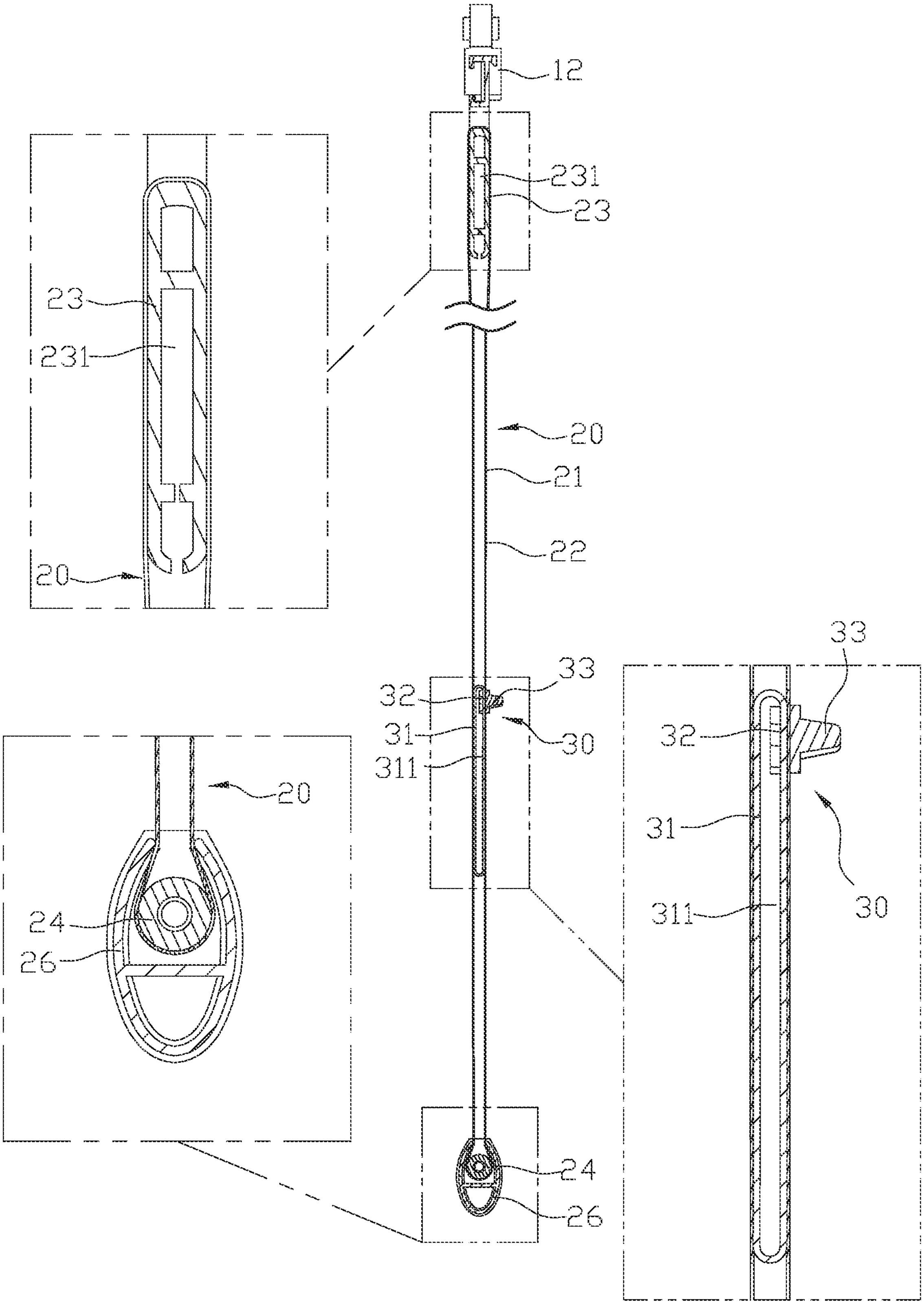
FIG. 6 is a cross-sectional view of the assembly of the dimmable curtain and the upper and lower shaft rods of the present invention.
Figure 7:
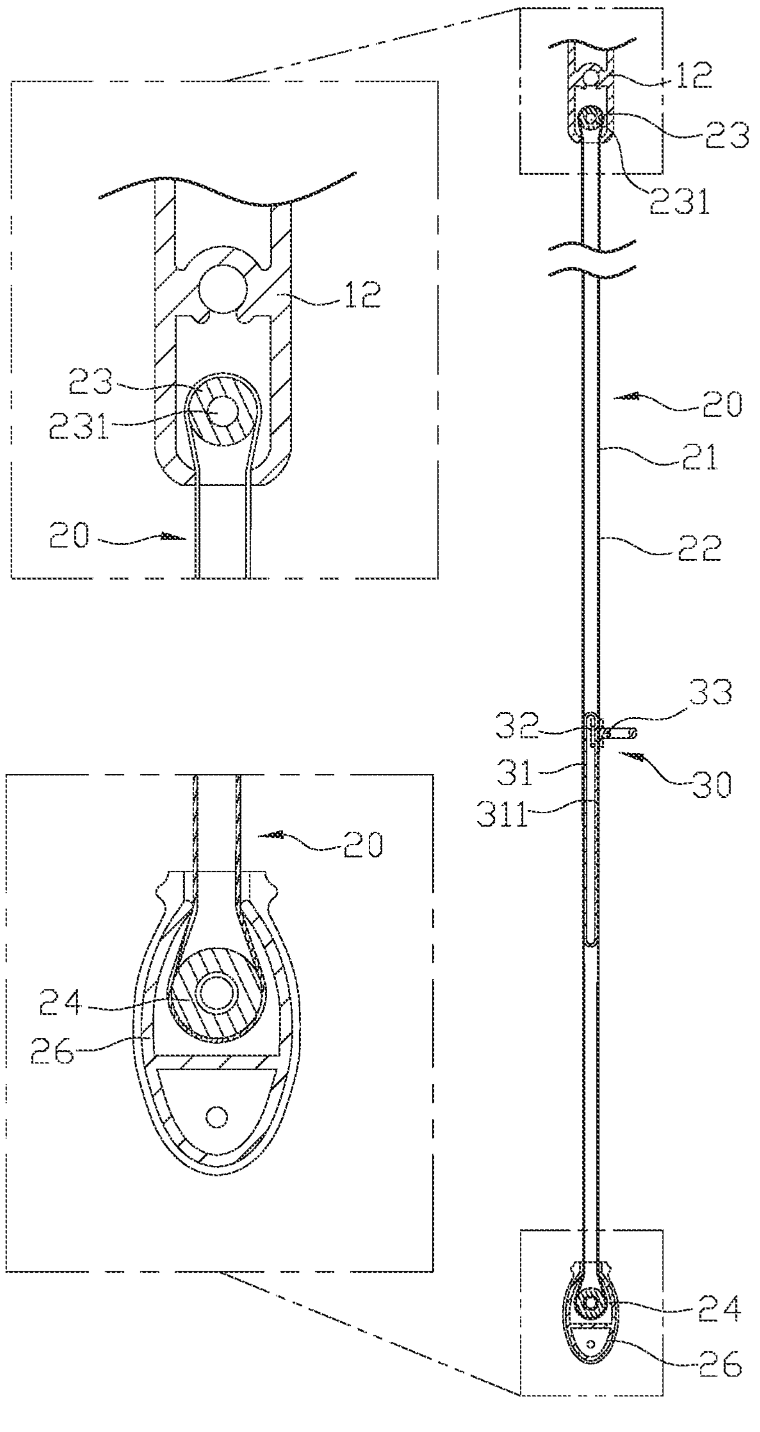
FIG. 7 is a cross-sectional view of another embodiment of the assembly of the dimmable curtain and the upper and lower shaft rods of the present invention.
Figure 8:
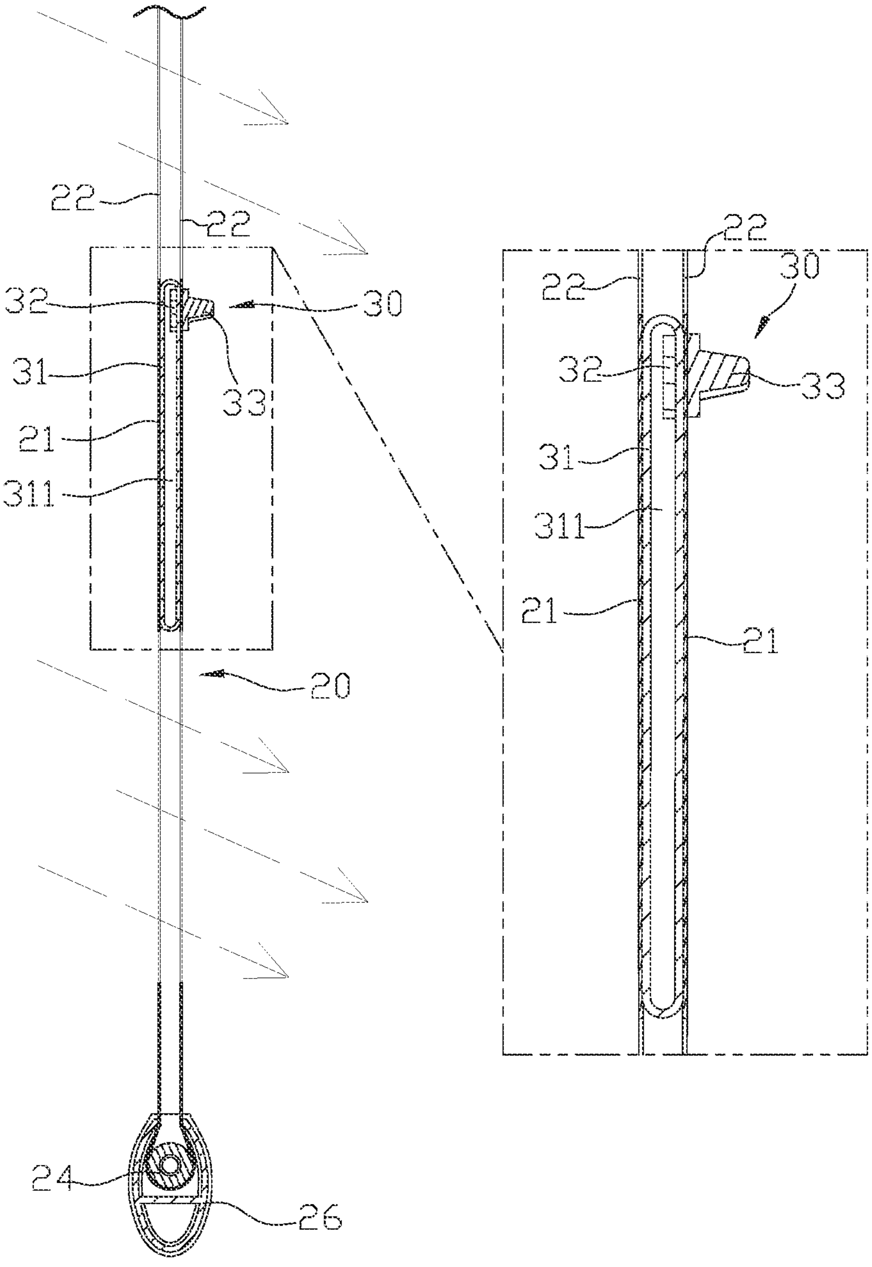
FIG. 8 is a schematic diagram of the dimmable curtain of the present invention in a fully light-transmitting state.
Figure 9:
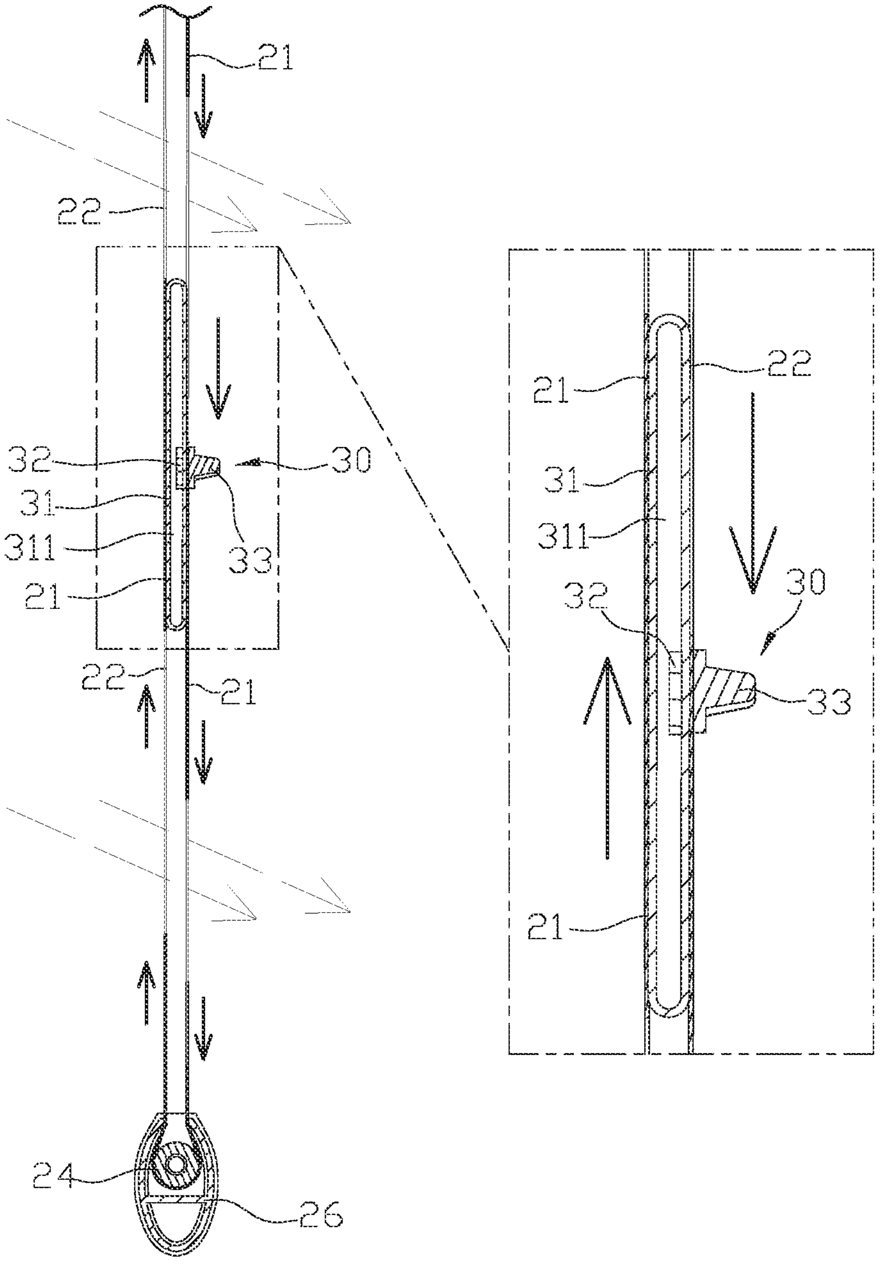
FIG. 9 is a schematic diagram of the dimmable curtain adjusting the light of the present invention.
Figure 10:
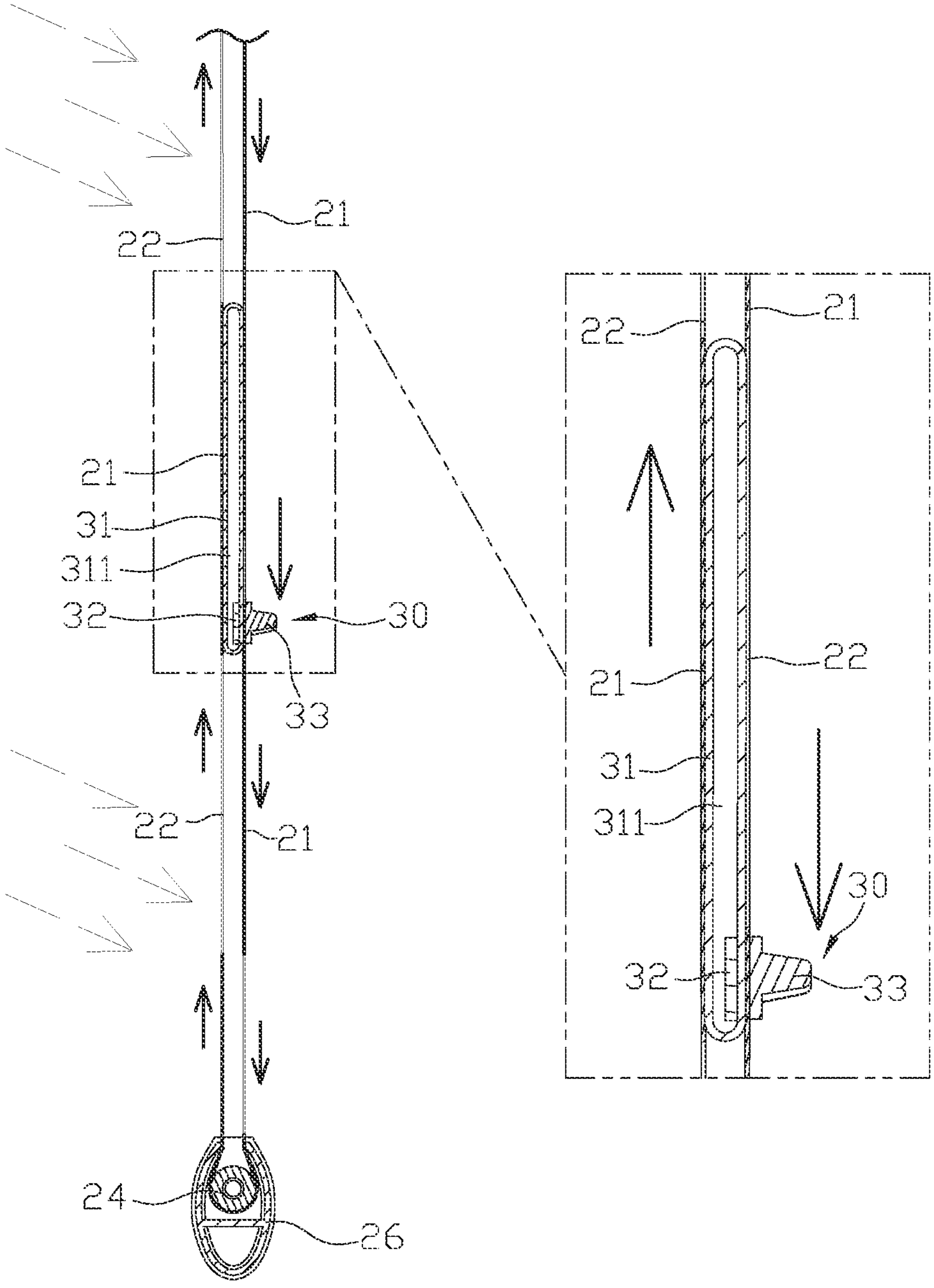
FIG. 10 is a schematic diagram of the dimmable curtain of the present invention forming a light-shielding state.

Further, the upper shaft rod 23 can be a flat tube (as shown in FIG. 6), and the upper shaft rod can be a round tube (as shown in FIG. 7) as well.

FIGS. 4, and 8-10 illustrate the actual operation of the invention. The dimmable curtain 20 is ring-shaped between the upper and lower shaft rods 23 and 24 to form the double-layer state, the upper shaft rod 23 is connected to the sliding seat 12, and the dimmable curtain 20 is further hung on the lower end of the top beam 10 in sequence to form a dimmable sheet curtain or a light-adjustable shade. When the light shielding parts 21 of the dimmable curtain 20 are relatively aligned, the light transmitting parts 22 are also relatively aligned to form a fully light transmitting state, so that the light outside the window can pass through the light transmitting parts 22 and shine into the house. At this time, the slider 32 of the positioning device 30 is located at the top of the longitudinal channel 311 of the positioning part 31. When the user wants to adjust the range and brightness of the light entering the room, the user can apply force through the moving block 33. When the moving block 33 is pulled downward, the slider 32 is driven to move downward along the longitudinal channel 311 of the positioning part 31, so that the originally aligned light shielding parts 21 will gradually move away and block the light transmitting parts 22. The larger the area of the light shielding parts 21 that block the light transmitting parts 22, the less light can shine into the room, thereby achieving the effect of adjusting the light. When the light shielding parts 21 completely block the light transmitting parts 22, the light is completely blocked from entering the room to form a light shielding state. The slider 32 also moves with the moving block 33 to the bottom end of the longitudinal channel 311. When the user wants to adjust the light entering the room, the user can use the moving block 33 by applying force to drive the slider 32 to move upward along the longitudinal channel 311, and the light shielding parts 21 can be shifted away from the light transmitting parts 22 to adjust the light.

Figure 11:
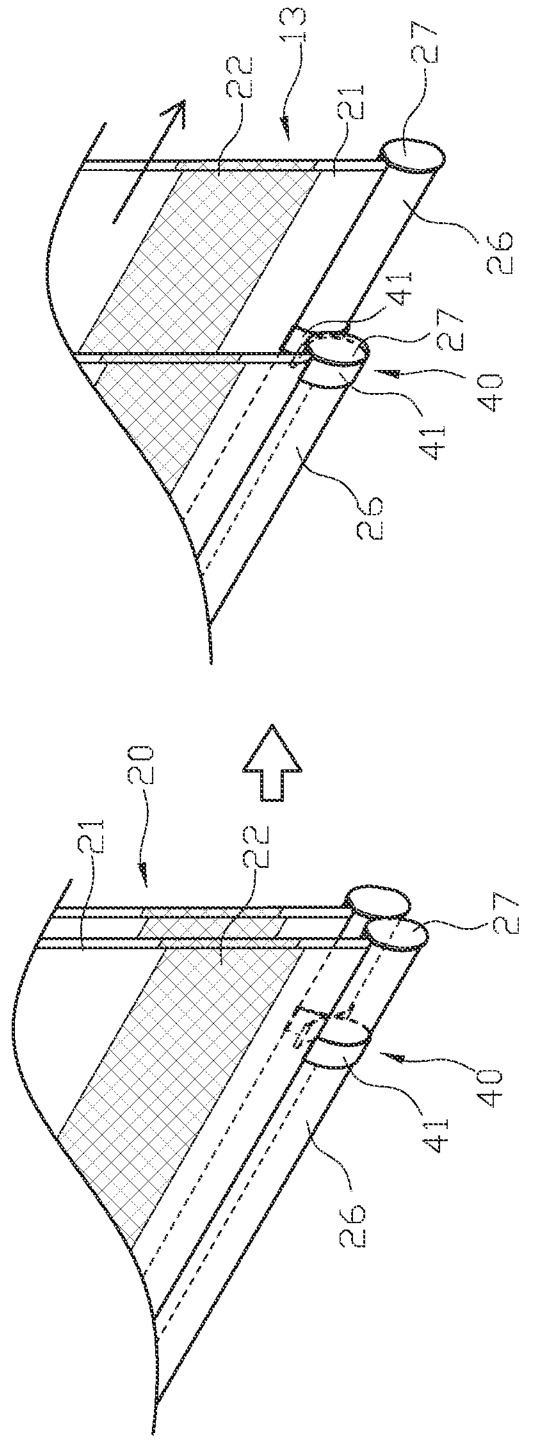
FIG. 11 is a schematic diagram of the push-pull action between the dimmable curtains of the present invention.
Figure 12:
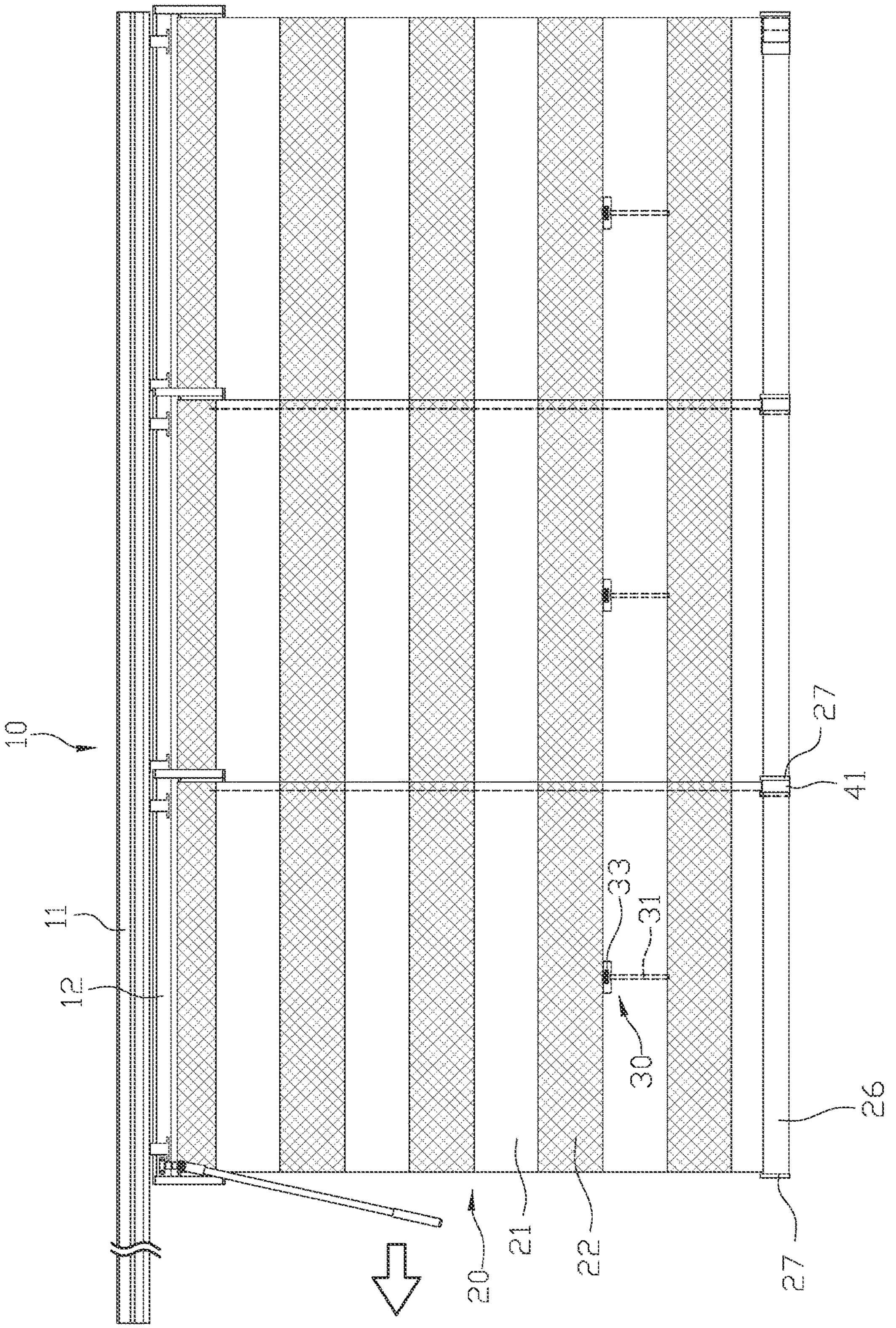
FIG. 12 is a schematic diagram of the unfolding of the dimmable curtain of this creation.
Figure 13:
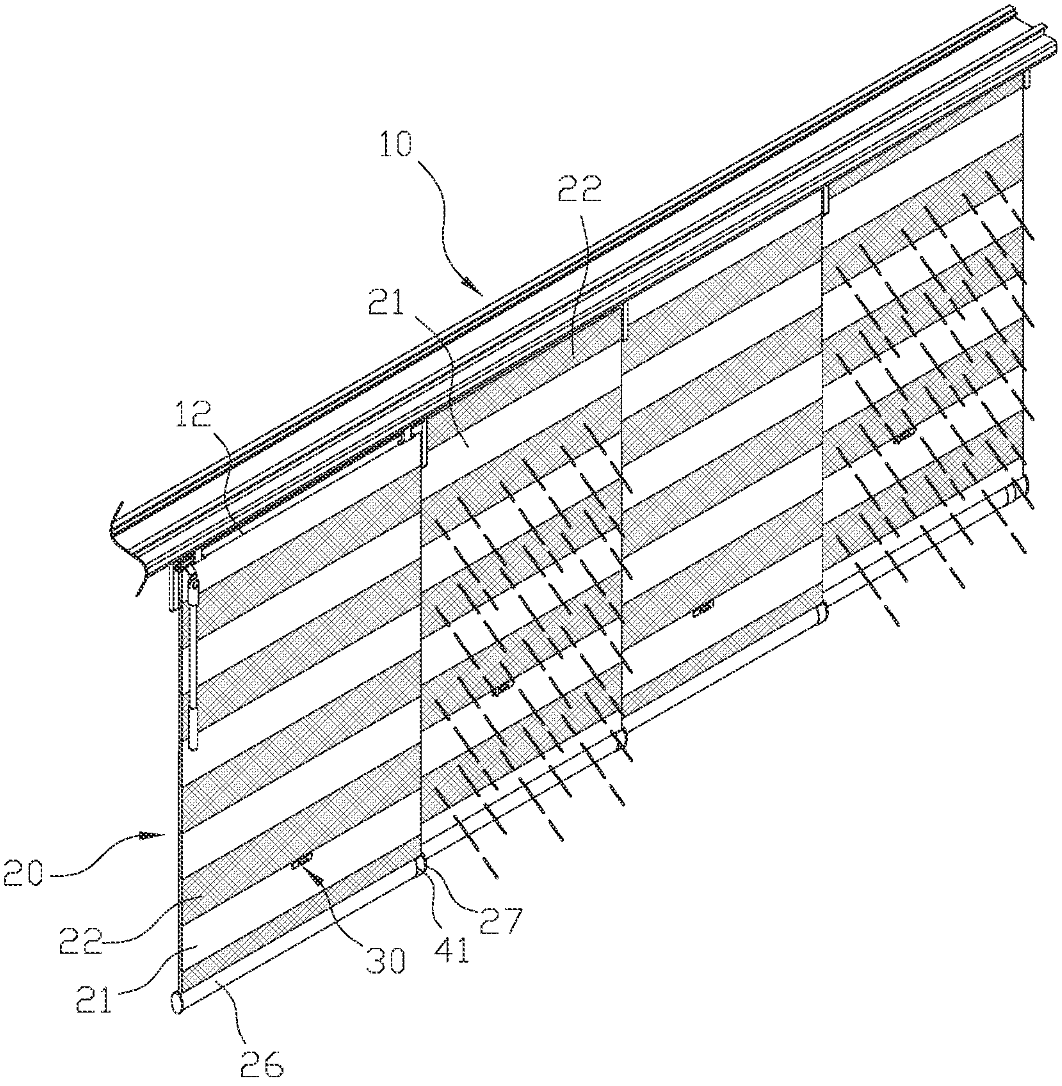
FIG. 13 is a schematic diagram of the dimmable curtain of the present invention unfolding and adjusting light respectively.

Furthermore, the dimmable curtains 20 are each equipped with a sliding seat 12, and the sliding seats 12 are sequentially assembled in the track 11 of the top beam 10. The sliding seats 12 have a structural relationship of mutual pulling and driving, and the expansion and closing effects of the dimmable curtain 20 are further achieved through the push and pull action of the sliding seats 12. The linking parts 40 are sequentially buckled to the lower tracks 26 of the bottom ends of the two adjacent dimmable curtains 20 through the two hooking parts 41. As shown in FIGS. 11-12, when the dimmable curtains 20 are moved along the track 11 of the top beam 10 via the slide 12 to form an unfolded state, not only the dimmable curtain 20 can be pulled out by pulling each other between the sliding seats 12, but the lower track 26 at the bottom of the dimmable curtain 20 can also be pulled out through the buckles of the linking part 40. When the dimmable curtains 20 are pulled out and unfolded, the lower track 26 will first move along one of the hooking parts 41 until one cover 27 of the lower track 26 abuts the hooking part 41, and then pushes the hooking part 41 through the cover 27 for displacement, so that the other hooking part 41 can move linearly along another lower track 26 until it abuts against another cover 27 of another lower track 26 to continuously move another dimmable curtain 20. So that the dimmable curtains 20 can be pulled out and unfolded in sequence to achieve light adjustment. Conversely, when the dimmable curtains 20 are pushed back to fold, it is not only driven by the traction between the sliding seats 12, but also driven through the hooking part 41 of the linking par 40 and the cover 27 of the lower track 26. When the dimmable curtains 20 are pushed and pulled, the hooking part 41 is used to abut against the cover 27 of the lower track 26 to achieve the purpose of interlocking. The dimmable curtains 20 are each equipped with a positioning device 30. When the dimmable curtains 20 are pulled out and unfolded, each of the dimmable curtains 20 can adjust the light through the positioning device 30, so that it can have the effect of partial light transmission while pursuing privacy in life, as shown in FIG. 13, which greatly improves the variability of indoor light adjustment.

According to the above-mentioned embodiments, the present invention provides several advantages. The dimmable, or light-adjustable, curtain of the present invention is double-layered and is staggered with the light shielding part 21 and the light transmitting part 22, so that the dimmable curtain 20 can be pushed and opened along the track 11 of the top beam 10. In addition, the effect of adjusting the light can also be achieved by staggering or facing the light shielding part 21 and the light transmitting part 22, so that the dimmable curtain 20 can be adjusted individually for the position where light is transmitted or shielded. When pursuing privacy in the house, it can also maintain local light transmission effect. Each dimmable curtain 20 is equipped with a positioning device 30. The moving block 33 located on the outer surface of the dimmable curtain 20 can be used to drive the slider 32 to move up and down along the positioning part 31 to achieve the function of adjusting light by the dimmable curtain 20. Further, through the contact between the slider 32 and the top or bottom end of the positioning part 31, the purpose of adjusting and positioning the dimmable curtain 20 can be achieved.

The light-adjustable shade of the present invention is matched with a plurality of linking parts 40 to achieve the effect of pulling and linking the dimmable curtain 20. The linking parts 40 are sequentially buckled with two hook parts 41 between two adjacent lower tracks 26. The covers 27 at both ends of the lower track 26 are formed against the hook parts 21 when the dimmable curtain 20 is pushed, pulled, or closed, thereby effectively simplifying the linkage between the dimmable curtains 20. At the same time, the linking part 40 is used to connect two adjacent dimmable curtains 20 to increase the stable connection effect between the dimmable curtains 20. When the dimmable curtains 20 are pulled and unfolded, the two adjacent dimmable curtains 20 can be prevented from making noise from the lower tracks 26 colliding with each other, and can effectively prevent the edges of two adjacent dimmable curtains 20 from being squeezed and deformed. The overlapping areas can be maintained between the dimmable curtains 20 to prevent light transmission and achieve the purpose of shading.

What is claimed is:

1. A light-adjustable shade structure, comprising:

a top beam, a bottom of the top beam is provided with a plurality of tracks, the tracks are respectively equipped with a sliding seat, and the adjacent sliding seats are connected and driven by each other;

a plurality of dimmable curtains, the plurality of dimmable curtains are staggered from top to bottom with a plurality of light shielding parts and a plurality of light transmitting parts, the plurality of dimmable curtains are wound and connected respectively between an upper shaft rod and a lower shaft rod, the upper and lower shaft rods are used to pull and support the plurality of dimmable curtains to form a double-layer structure, and two ends of the upper shaft rod are respectively connected to two combination blocks;

a plurality of positioning devices installed on the plurality of dimmable curtains, the positioning devices each comprise a positioning part, a slider and a moving block that move along the positioning part, the positioning part is longitudinally disposed inside the double-layer structure of the plurality of dimmable curtains, and the positioning part is attached and fixed to one side of the plurality of dimmable curtains, the slider is disposed inside the double-layer structure of the plurality of dimmable curtains, the slider is attached and fixed to the other side of the plurality of dimmable curtains, and the moving block is attached and fixed to the outer surface of the plurality of dimmable curtains, when the moving block is operated to adjust the plurality of dimmable curtains to form a transparent or light-shielding state, the slider moves up and down along the positioning part at the same time, and further adjusts and positions the plurality of dimmable curtains through the contact between the slider and the positioning part; and a plurality of linking parts having two corresponding hooking parts used to hook the lower tracks at the bottom end of two adjacent curtains of the plurality of dimmable curtains, when the two adjacent curtains are pushed and pulled, the hooking parts abut against a cover of the lower tracks to achieve connection and moving functions.

2. The light-adjustable shade structure of claim 1, wherein, two through holes are formed at both ends of the sliding seat, two openings are formed at both ends of the upper shaft rod, and a first convex part and a second convex part are provided on the same side of the combination block, the first and second convex parts are respectively combined with the through hole and the opening so that the sliding seat and the upper shaft rod are assembled and connected through the two combination blocks.

3. The light-adjustable shade structure of claim 1, wherein, the lower shaft rod is sunk at the bottom end of the plurality of dimmable curtains, the lower track is inserted outside the lower shaft rod and the plurality of dimmable curtains, the two ends of the lower track are assembled with two covers, and the covers are combined and fixed with both ends of the lower shaft rod.

4. The light-adjustable shade structure of claim 1, wherein, the positioning part of the positioning device is hollow and has a longitudinal channel, the slider is penetrated in the longitudinal channel of the positioning part, the surface of the slider has a guide groove, the guide groove is engaged with the positioning part to guide the slider, and the slider is attached and fixed to the plurality of dimmable curtains with the surface not having the guide groove.

5. The light-adjustable shade structure of claim 4, wherein, the moving block of the positioning device is aligned with the slider and fixed on the outer surface of the plurality of dimmable curtains so that the moving block can directly drive the slider to linearly move along the longitudinal channel of the positioning part.

6. The light-adjustable shade structure of claim 5, wherein, a length of the positioning part of the positioning device is equal to a length of the light shielding part, the positioning part is attached and fixed to the inner surface of one of the light shielding parts, and the slider and the moving block are aligned and attached to the upper edge of one of the light shielding parts.

7. The light-adjustable shade structure of claim 1, wherein, the upper shaft rod is a flat tube.

8. The light-adjustable shade structure of claim 1, wherein, the upper shaft rod is a round tube.

9. The light-adjustable shade structure of claim 1, wherein, the hooking part of the linking part is formed corresponding to an outer contour shape of the lower track, the upper end of the hooking part forms a shrinkage, a size of the shrinkage is smaller than a size of the widest part of the lower track, and the hooking part is flexibly hooked the lower track.

* * * * *